United States Patent
Ujibashi et al.

(10) Patent No.: US 10,528,594 B2
(45) Date of Patent: Jan. 7, 2020

(54) DATABASE SYSTEM, INFORMATION PROCESSING DEVICE AND DATABASE PROGRAM

(71) Applicant: FUJITSU LIMITED, Kawasaki-shi, Kanagawa (JP)

(72) Inventors: Yoshifumi Ujibashi, Kawasaki (JP); Motoyuki Kawaba, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 973 days.

(21) Appl. No.: 15/059,382

(22) Filed: Mar. 3, 2016

(65) Prior Publication Data
US 2016/0267162 A1    Sep. 15, 2016

(30) Foreign Application Priority Data

Mar. 11, 2015    (JP) ................................ 2015-048177

(51) Int. Cl.
G06F 17/30 (2006.01)
G06F 16/27 (2019.01)
G06F 16/23 (2019.01)

(52) U.S. Cl.
CPC ............ *G06F 16/278* (2019.01); *G06F 16/23* (2019.01)

(58) Field of Classification Search
None
See application file for complete search history.

(56) References Cited

U.S. PATENT DOCUMENTS

| | | | |
|---|---|---|---|
| 5,870,752 A * | 2/1999 | Gibbons | G06F 16/2358 |
| 9,076,156 B2 * | 7/2015 | Newnham | G06Q 30/02 |
| 9,286,001 B2 * | 3/2016 | Skjolsvold | G06F 9/5077 |
| 9,372,889 B1 * | 6/2016 | Jakobsson | G06F 16/24542 |
| 2002/0099691 A1 * | 7/2002 | Lore | G06F 16/2237 |
| 2009/0070303 A1 * | 3/2009 | Beavin | G06F 16/24537 |

(Continued)

FOREIGN PATENT DOCUMENTS

| | | |
|---|---|---|
| JP | 2000-347911 | 12/2000 |
| JP | 2008-217797 | 9/2008 |
| JP | 2013-080403 | 5/2013 |

OTHER PUBLICATIONS

Paul Zikopoulos et al., "DB2 10.5 with BLU Acceleration", New Dynamic In-Memory Analytics for the Era of Big Data, Apr. 26, 2013, pp. 1-47 (25 pages).

*Primary Examiner* — Aleksandr Kerzhner
*Assistant Examiner* — Eddy Cheung
(74) *Attorney, Agent, or Firm* — Fujitsu Patent Center

(57) ABSTRACT

A database system includes a storage device which stores a database storing a plurality of data groups, range information including a minimum and a maximum of an appointed item, a total value and a number of the data, and an information processing device comprises a processor configured to, in response to deletion of a first data, update the total value and the number of the data, calculate a difference between a first total value, based on the number of the data and at least one of the maximum and the minimum in the range information, and a second total value which is updated, as minimum or maximum, judge at least one of whether or not the minimum which is calculated exceeds the minimum in the range information and whether or not the maximum which is calculated is less than the maximum in the range information, and update the range information.

20 Claims, 10 Drawing Sheets

(56) References Cited

U.S. PATENT DOCUMENTS

2010/0030800 A1\* 2/2010 Brodfuehrer ....... G06F 16/2282
707/803
2010/0042637 A1 2/2010 Tsuchida et al.
2015/0186466 A1\* 7/2015 Gaza ................. G06F 16/24544
707/714

\* cited by examiner

DATABASE SYSTEM, INFORMATION PROCESSING DEVICE AND DATABASE PROGRAM

CROSS-REFERENCE TO RELATED APPLICATION

This application is based upon and claims the benefit of priority of the prior Japanese Patent Application No. 2015-048177, filed on Mar. 11, 2015, the entire contents of which are incorporated herein by reference.

FIELD

The embodiments discussed herein are related to database system, an information processing device and database program.

BACKGROUND

There is a database system which divide the data of the database into plural partitions and speed up the search of data. Each of partitions has range information. The range information indicates the value range of the appointed item in a plurality of data of which the partition has.

A program (called as access program as follows), which accesses such a database, performs search processing of the data using the range information of each partition. Especially, the access program judges whether each partition has the data which matches the search condition based on the range information at the time of the search of data. And the access program performs the search processing of the data for the partition having the data which matches the search condition as the target. That is, the partition which does not have data matching the search condition is out of the search, thereby the search processing becomes high-speed.

On the other hand, the access program updates the range information depending on processing of new addition, update and deletion of the data for the database. For example, the access program scans all data which a partition after the deletion has, depending on the deletion of data, and updates the range information.

Patent documents 1-3 disclose the technique to divide a database into a plurality of partitions.

CITATION LIST

Patent Document

[Patent document 1] Japanese Laid-Open Patent Publication No. 2013-080403.
[Patent document 2] Japanese Laid-Open Patent Publication No. 2000-347911.
[Patent document 3] Japanese Laid-Open Patent Publication No. 2008-217797.

SUMMARY

However, when the partition has a large quantity of data, a processing load to depend on the scan processing of all data in the partition is high. Therefore, because the scan processing is carried out at every update processing of the range information, the load of the database system becomes higher. Therefore, influence may occur in the performance of other processing to work with the database system and other access processing to the database.

According to a first aspect of the embodiment, a database system includes, a storage device which stores a database storing a plurality of data groups, range information including a minimum and a maximum of an appointed item in data in each of the plurality of data groups, a total value of the appointed item of the each of the plurality of data groups and a number of the data in the each of the plurality of data groups, and an information processing device includes, a processor configured to, in response to deletion of a first data in a data group, update the total value of the appointed item and the number of the data, calculate a difference between a first total value of the appointed item, based on the number of the data and at least one of the maximum and the minimum in the range information before updating, and a second total value of the appointed item which is updated, as minimum or maximum of the data group after the deletion, judge at least one of whether or not the minimum which is calculated exceeds the minimum in the range information and whether or not the maximum which is calculated is less than the maximum in the range information, and update the range information depending on the judgment.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, embodiments will be described according to figures. But the technical range in the invention are not limited to the embodiments, are extended the subject matters disclosed in claims and its equivalents.

[Partition Division of the Database]

Figure 1:
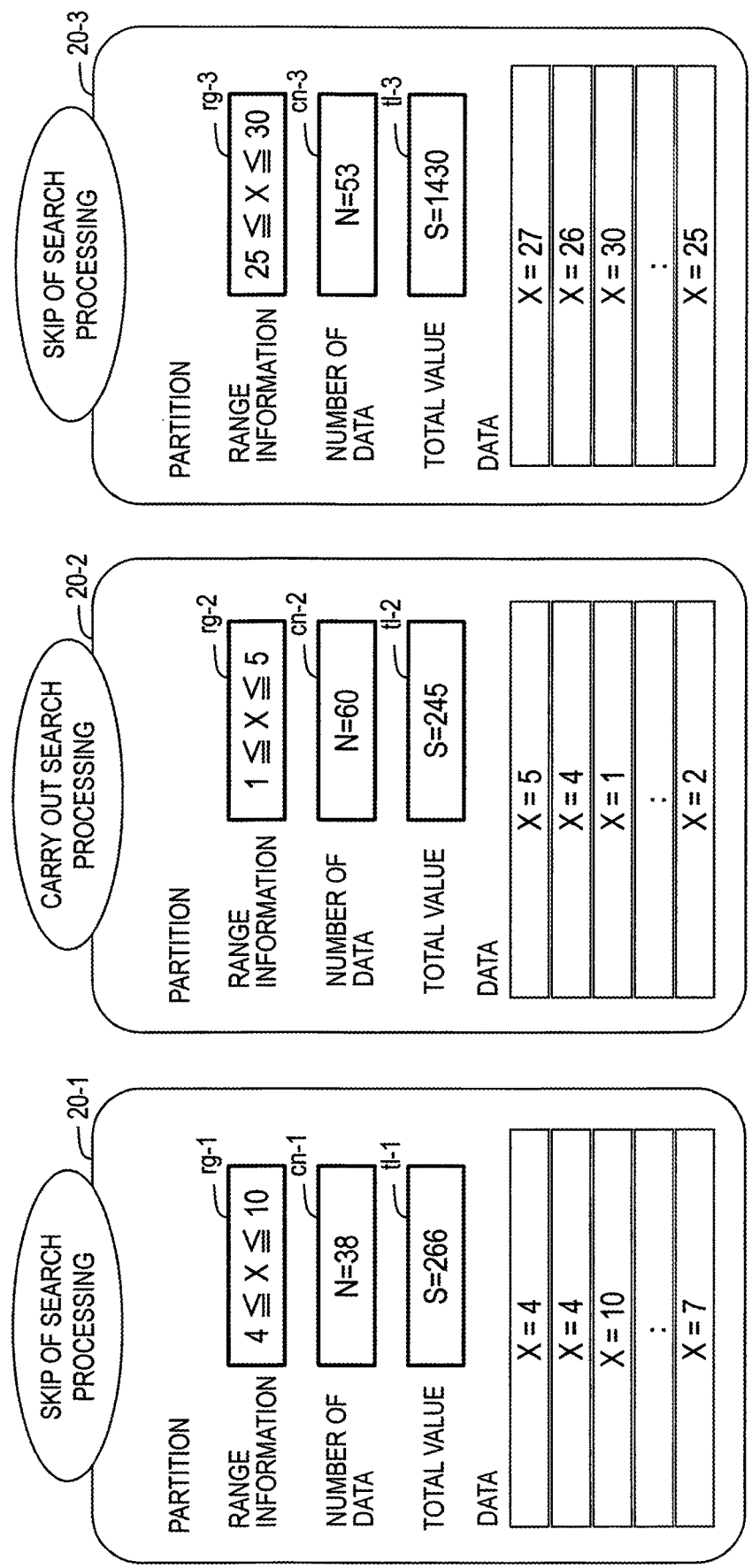
FIG. 1 is a diagram explaining a summary of partition division of the database.

FIG. 1 is a diagram explaining a summary of partition division of the database. The partition division of the database is a technique to divide the data group which the database has into a plurality of data groups. In the example of FIG. 1, the database has three partitions 20-1~20-3 (also called as a partition 20) which are divided the data group into three. In this embodiment, the data have appointed item "X". The data may have a plurality of items.

Each of the partitions 20-1~20-3 has the range information rg-1~rg-3 (also called as range information rg) by sorting the data group into a plurality of partitions 20-1~20-3. Furthermore, each of the partitions 20-1~20-3 has a total number "S" (tl-1~tl-3) (also called as total number tl) of the data of the appointed item "X" in the partition, and number "N" of the data (cn-1~cn-3) (also called as number of the data cn) in the partition. When the data in each partition 20 is added and deleted and the appointed item "X" in the data is updated, the total number "S" (tl) of the data and the number of the data "N" (cn) are updated, too. It is not needed to scan all data in each partition 20 to update the total number "S" and the number of the data "N" of data, because it is possible to update the total number "S" (tl) according to the appointed item "X" is updated by the addition and the deletion of the data.

The program (called as access program) to access the database depicted by FIG. 1 judges the partition 20-1~20-3 for the access target with reference to the range information rg-1~rg-3. The range information rg has the minimum and the maximum of the data in each partition 20 regarding to the appointed item "X" among the plurality of items (column) in the database.

In the example of FIG. 1, the range information rg-1 of the partition 20-1 is the value range "4<=X<=10". In other words, the range information rg-1 indicates that the minimum of the appointed item of the data of which the partition 20-1 has is value "4", and the maximum of the appointed item is value "10". For example, when the database has the sales information of the product, the appointed item "X" is an item having the numerical value such as the number or the amount of money of the product which is sold. In addition, for example, the appointed item may be a date or time. When data have a plurality of appointed items, the range information, the total value tl of data and the number of data cn may be stored in each partition 20 for every item.

In addition, the range information rg-2 of the partition 20-2 is value range "1<=X<=5", and the range information rg-3 of the partition 20-3 is value range "25<=X<=30". In other words, the range information rg-2 indicates that the minimum of the appointed item in the data in the partition 20-2 is value "1", and the maximum is value "5". In addition, the range information rg-3 indicates that the minimum of the appointed item in the data in the partition 20-3 is value "25" and the maximum is value "30".

The program (called as access program) to access the database depicted in FIG. 1 judges that the partition 20-1~20-3 have data which matches the search condition based on the search condition with reference to the range information rg-1~rg-3. And the access program carries out the search processing for the partition 20 matching with the search condition as the search target. In other words, the access program removes the partition 20 which does not have data matching the search condition from the search target. In this way, based on the range information rg-1~rg-3, the access program filters the partitions 20 for the search target, thereby the access program speeds up the search processing.

FIG. 1 exemplifies a case to search the data with the value "X" of the appointed item less than value "3" from the database according to the search condition "where X<3". The access program determines that the partition 20 having the data which matches the search condition "where X<3" among the partitions 20-1~20-3 based on the range information rg-1~rg-3. According to the range information rg-1~rg-3 depicted in FIG. 1, the partition 20-2 matches the search condition.

Therefore, the access program carries out the search processing for the partition 20-2 as the target. In addition, the access program performs a skip (abbreviation) of the search processing for the partitions 20-1 and 20-3. In this way, by omitting the search processing for the partitions 20-1 and 20-3, the total number of the data for the search decreases, thereby the search processing becomes high-speed.

In addition, FIG. 1 exemplifies a case that the access program determines that one partition 20-2 is a search object among the partitions 20-1~20-3 based on the range information rg-1~rg-3. But it is not a thing limited to this example. The access program may determine the plurality of partitions 20 as the search object depending on the search condition based on the range information rg.

Further, in addition to the search processing of the data, the update processing (UPDATE) and deletion processing (DELETE) of the data include the search processing of the data, too. In other words, the access program searches data for the update at the time of the update of data and updates the data which is searched. Therefore, it is possible that the access program speed up the update processing time and the deletion processing time based on the range information rg, too.

In addition, depending on the update processing, the deletion processing of the data, and the additional processing (INSERT), the range information rg may change. Therefore, the access program updates the range information rg in response to the update processing, the deletion processing of data, and the additional processing as needed. Then, according to FIGS. 2A-C, the update processing of the range information rg will be exemplified. According to FIGS. 2A-C, the update processing of the range information rg depending on the deletion process of data will be explained.

[Update of the Range Information]

Figure 2:
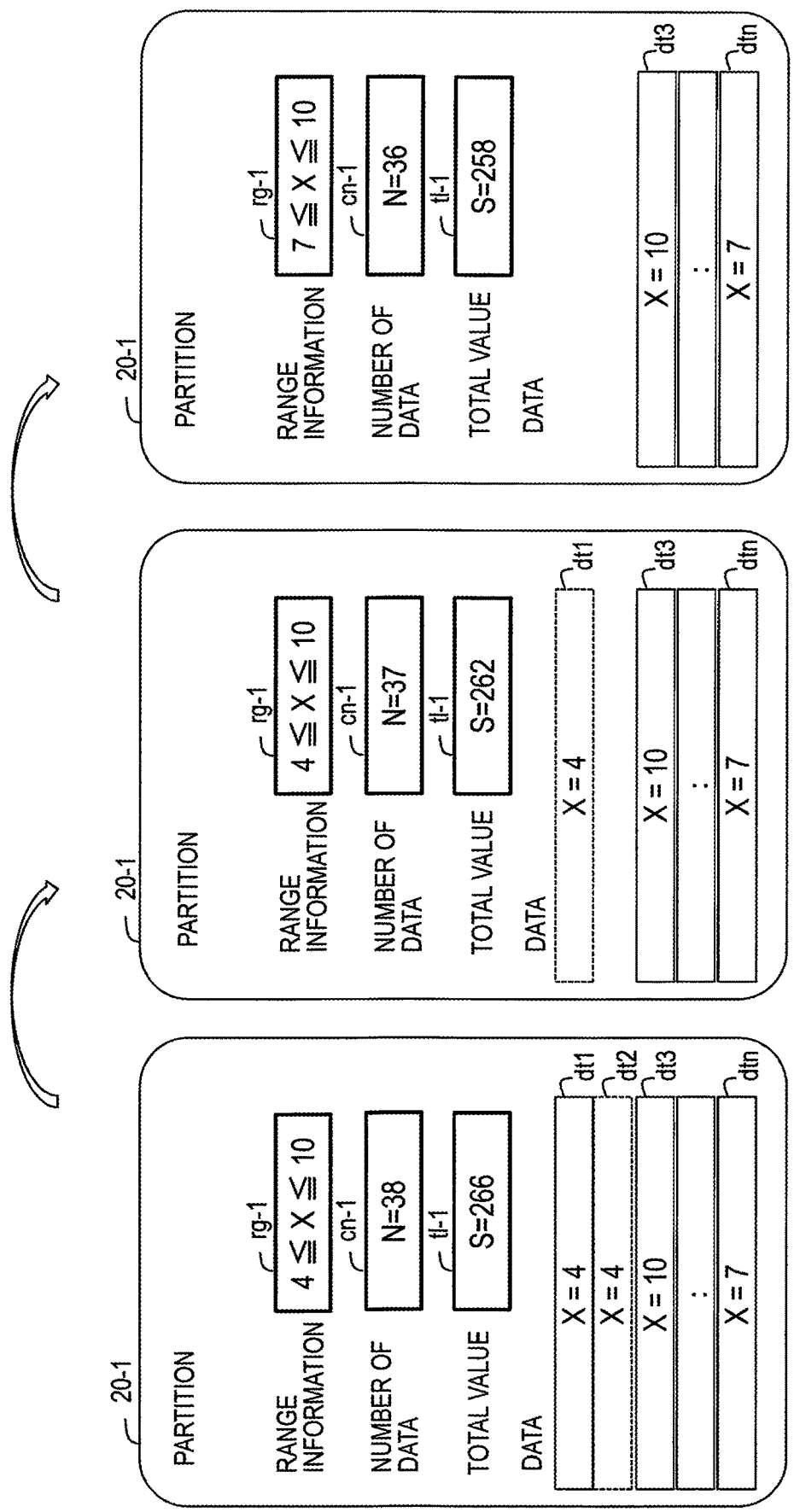
FIGS. 2A-C are diagrams explaining the update processing of the range information rg depending on the data deletion by the access program.

FIGS. 2A-C are diagrams explaining the update processing of the range information rg depending on the data deletion by the access program. In FIGS. 2A-C, the same elements which are represented in FIG. 1 are indicated by same sign.

FIGS. 2A-C exemplify the case that all the data of which the appointed item is value "X=4" are deleted from the database. In response to the deletion instruction of data, the access program detects the partition 20-1 having data of value "X=4" among the partitions 20-1~20-3 (referring to FIG. 1) with reference to the range information rg-1~rg-3 (referring to FIG. 1). Therefore, each of FIG. 2A-FIG. 2C exemplifies the partition 20-1.

The access program deletes data of value "X=4" one by one from the data dt1-dtn in the partition 20-1. As depicted by FIG. 2A, at first the access program deletes the data dt2 represented by a dotted line from the partition 20-1. Then, as depicted by FIG. 2B, the access program deletes the data dt1 represented by a dotted line from the partition 20-1. The access program in this way deletes all the data of value "X=4" from the partition 20-1.

Then, when the value of the data which are deleted corresponds to the minimum or the maximum of range information rg, the access program scans all the data of partition 20 of the object after the deletion and updates the range information rg. Because the value "X=4" corresponds to the minimum of range information rg-1, the access program updates the range information rg-1. As depicted by FIG. 2C, the access program scans (confirms) the value "X" of data dt3~dtn one by one in the partition 20-1 after the deletion, and acquires the new minimum. In an example of FIG. 2A~FIG. 2C, the new minimum of value "X" is value "X=7". Accordingly, the access program updates the range information rg-1 of the partition 20-1 to the value range "7<=X<=10", as represented by FIGS. 2A-C.

As explained by FIG. 2C, when the access program carries out the update processing of the range information rg-1, the access program scans all the data in the partition 20-1 after the deletion. When the partition 20-1 has a large quantity of data of tens of thousands and hundreds of thousands, the load of the scan processing of data becomes higher.

In the database system, other access processing for the same database and other processing using the same CPU (Central Processing Unit) work parallel to the deletion processing of data. Accordingly, by the load of the scan processing of data depending to the update processing of the range information rg, influence produces in performance of other access processing for the same database and other processing using the same CPU. In other words, other access processing for the same database and other processing using the same CPU may become slow. In addition, by an execution of the scan processing of data depending to the update processing of the range information rg, it takes more time for the access processing itself of the database.

In this way, it is desirable that the load is suppressed when updating of the range information rg. Therefore, the access program in the present embodiment updates the range information rg without scanning all the data of partition 20. Then, according to FIG. 3, a summary of the update processing of the range information rg in the embodiment will be explained.

SUMMARY OF THE EMBODIMENT

Figure 3:
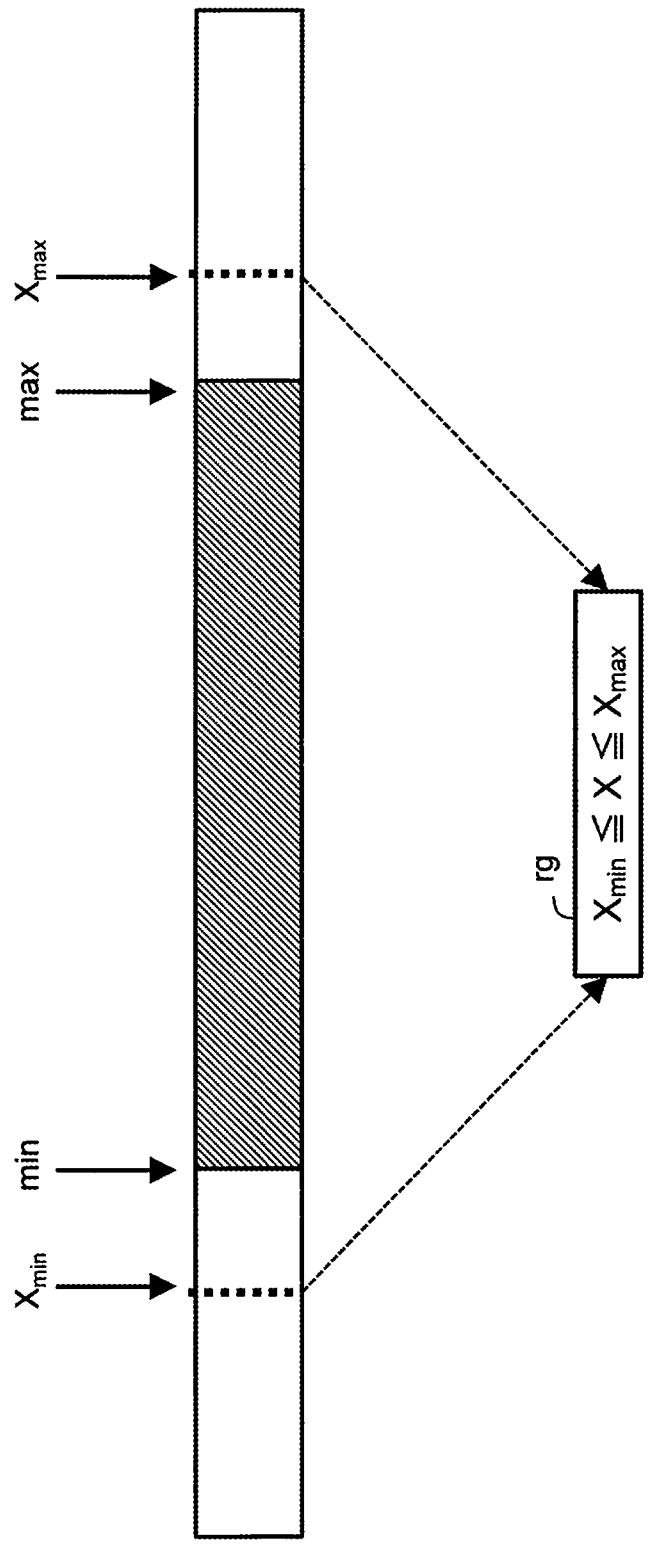
FIG. 3 is a diagram explaining a summary of the update processing of the range information rg according to the embodiment.

FIG. 3 is a diagram explaining a summary of the update processing of the range information rg according to the embodiment. FIG. 3 exemplifies the range information rg of one partition 20 among three partitions 20-1~20-3 that are represented by FIG. 1.

The access program according to the embodiment updates the range information rg according to calculation processing, in the value range "Xmin<=X<=Xmax" depicted by in FIG. 3, without scanning all the data of partition 20. The value "Xmin" depicted by FIG. 3 indicates the minimum in the range information rg of the appointed item in the partition 20, and the value "Xmax" indicates the maximum in the range information rg. In addition, the value "min" depicted by FIG. 3 indicates the real minimum of the appointed item in the partition 20, and the value "max" indicates the real maximum.

As depicted by FIG. 3, the access program according to the embodiment updates the range information rg in the value range including a range based on real minimum "min" and real maximum "max" which represents by a slanted line in FIG. 3. Especially, in FIG. 3, the minimum "Xmin" in the range information rg is a value less than real minimum "min", and the maximum "Xmax" in the range information rg is a value more than real maximum "max".

Because the range information rg includes a real value range, it is possible that the access program carries out the search processing without causing an oversight of the search based on the range information rg. In other words, it is possible that the access program carries out the search processing exactly based on the range information "Xmin<=X<=Xmax" rg depicted by FIG. 3. In this way, the range information "Xmin<=X<=Xmax" rg according to the embodiment does not need to match the real value range "min<=X<=max" of the partition 20, but includes the real value range.

On the other hand, precision of the filtering of partition 20 based on the range information rg decreases if a difference of range information rg "Xmin<=X<=Xmax" from the real value range "min<=X<=max" becomes big. In other words, when the range information rg has a big difference with the real value range even though the range information rg includes the real value range of partition 20, a case that the partition 20, of which the omission of the search processing is capable, does not become out of the search, is increased. Thereby, useless search processing occurs and performance of the search processing may not be improved enough.

Accordingly, the access program according to the embodiment updates the range information rg in the value range that includes the real value range and is not far apart from the real value range without performing the scan processing of data of partition 20 after the deletion.

That is, in the case of the deletion of the data in the partition, the access program according to the embodiment updates the number of the data "cn" and the total value "tl" of the appointed item in the partition 20 of the object. And the access program calculates the total value of the appointed item based on the number of the data "cn" which is updated and the maximum "Xmax" or the minimum "Xmin" in the range information rg and calculates a difference between the calculated total value of the appointed item and the total value "tl" of the appointed item which is updated, as the minimum of or the maximum of the partition 20 after the deletion. And the access program determines whether the minimum which is calculated is bigger than the minimum "Xmin" in the range information rg or whether the maximum which is calculated is smaller than the maximum "Xmax" in the range information rg, and updates the range information rg depending on the determination.

In other words, the access program according to the embodiment calculates the estimate of the minimum or the maximum of partition 20 after the deletion by calculation processing based on existing range information rg and the number of the data "cn" and the total value "tl" of the appointed item of the partition 20 after the deletion. And the access program updates the range information rg depending on a comparison result between the minimum or the maximum that is calculated and the existing range information rg. More detail of the processing will be described later according to FIG. 6~FIG. 9.

In this way, it is possible that the access program according to the embodiment simply updates the range information rg into the value range, which includes the real value range and is not far apart from the real value range, without scanning all the data of partition 20 after the deletion one by one. Therefore, it is possible that the access program avoids an oversight of the search and restrains outbreak of the useless search processing based on the range information rg while holding down the load when updating the range information rg.

Then, according to FIG. 4 and FIG. 5, hardware constitution and software block diagram of the database system according to the embodiment will be described.

[Hardware Constitution of the Database System]

Figure 4:
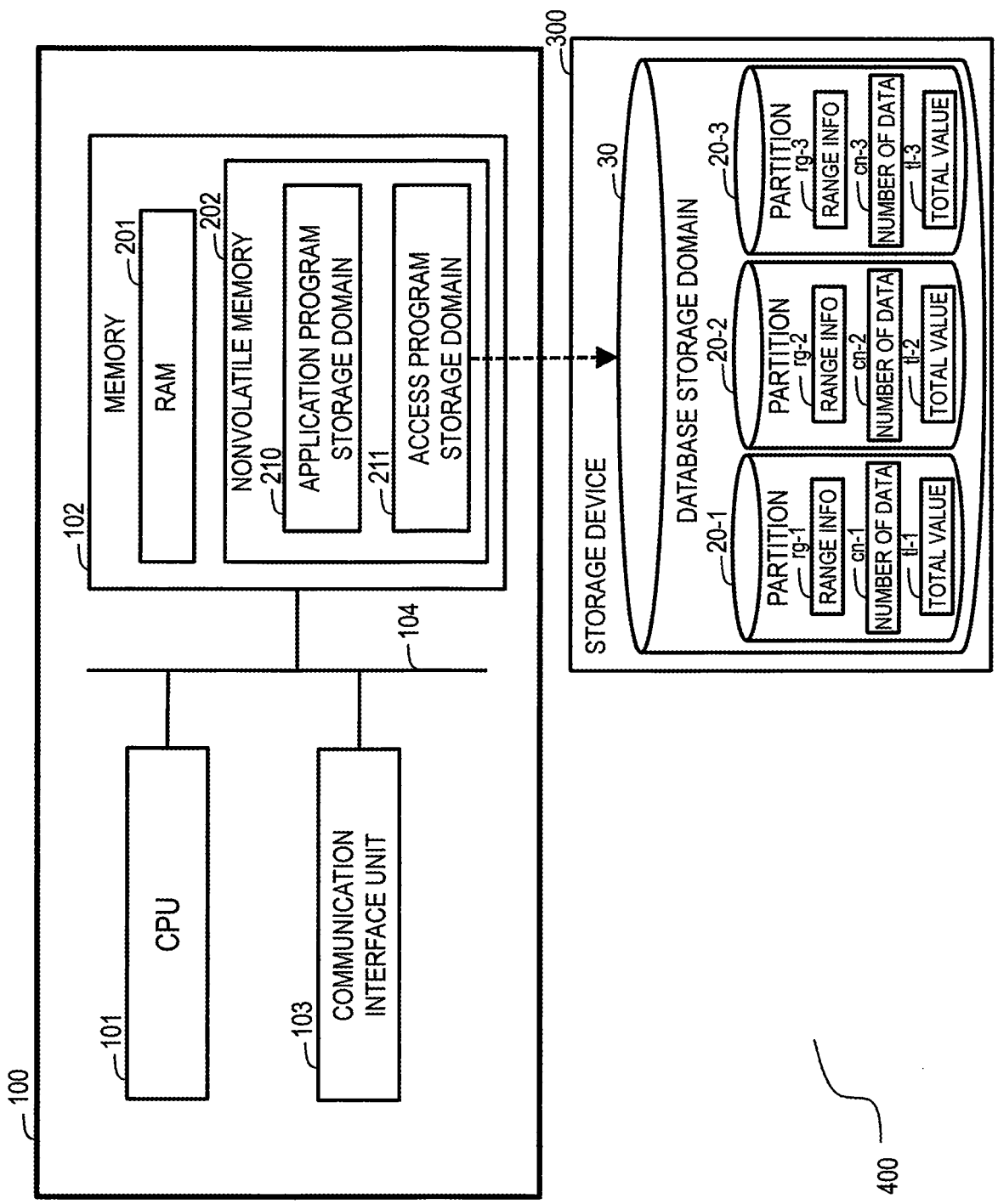
FIG. 4 is a diagram of hardware constitution of the database system 400 having the database which is depicted by FIG. 1 and FIGS. 2A-C.

FIG. 4 is a diagram of hardware constitution of the database system 400 having the database which is depicted by FIG. 1 and FIGS. 2A-C. In FIG. 4, same elements which are represented by FIG. 1, FIGS. 2A-C are represented by same sign.

In FIG. 4, database system 400 includes a storage device 300 and an information processing device 100, for example. The storage device 300 has a database storage domain 30. The database (called as the database 30, as follows) of the database storage domain 30 has a plurality of partitions 20-1~20-3 as illustrated by FIG. 1 and FIGS. 2A-C. Each of the partitions 20-1~20-3 has a plurality of data and the range information rg (referring to FIG. 1, FIGS. 2A-C) of the value of the appointed item in the plurality of data. In addition, each of the partitions 20-1~20-3 has information of the number of the data "cn" (referring to FIG. 1, FIGS. 2A-C) and the total value of the data "tl" (referring to FIG. 1, FIGS. 2A-C).

In addition, FIG. 1 and FIGS. 2A-C represented the example that each of the partitions 20-1~20-3 has range information "rg-1~rg-3" of single item. However, each of the partitions 20-1~20-3 may have range information "rg", number of the data "cn" and total value "tl" about each of a plurality of items.

An information processing device 100 depicted by FIG. 4 has, for example, a CPU (Central Processing Unit) 101, a memory 102 which includes a RAM (Random Access Memory) 201 and a nonvolatile memory 202, etc., and a communication interface unit 103. The all parts are connected through a bus 104 mutually.

The CPU 101 is connected to the memory 102, etc. through the bus 104 and controls the whole information processing device 100. The communication interface unit 103 connects with other devices (not illustrated in FIG. 4) through the Internet. The RAM 201 in the memory 102 stores the data of which the CPU 101 processes.

The nonvolatile memory 202 in the memory 102 includes a domain (not illustrated in FIG. 4) which stores program of the OS (Operating System) that the CPU 101 carries out. In addition, the nonvolatile memory 202 includes application program storage domain 210 and access program storage domain 211. For example, the nonvolatile memory 202 has an HDD (Hard disk drive) and a nonvolatile semiconductor memory.

Processes of the application program (below, called as application program 210) in the application program storage domain 210 is realized by execution of the CPU 101. The processes of the access program (below, called as access program 211) in the access program storage domain 211 is realized by execution of the CPU 101.

The application program 210 publishes a access demand for the database 30, of which the storage device 300 stores, for the access program 211 depending on any processing. The access program 211 carries out the access process to the database 30 in response to the access demand from the application program 210. More information about the process of the access program 211 will be explained according to FIG. 5.

[Software Block of the Information Processing Device]

Figure 5:
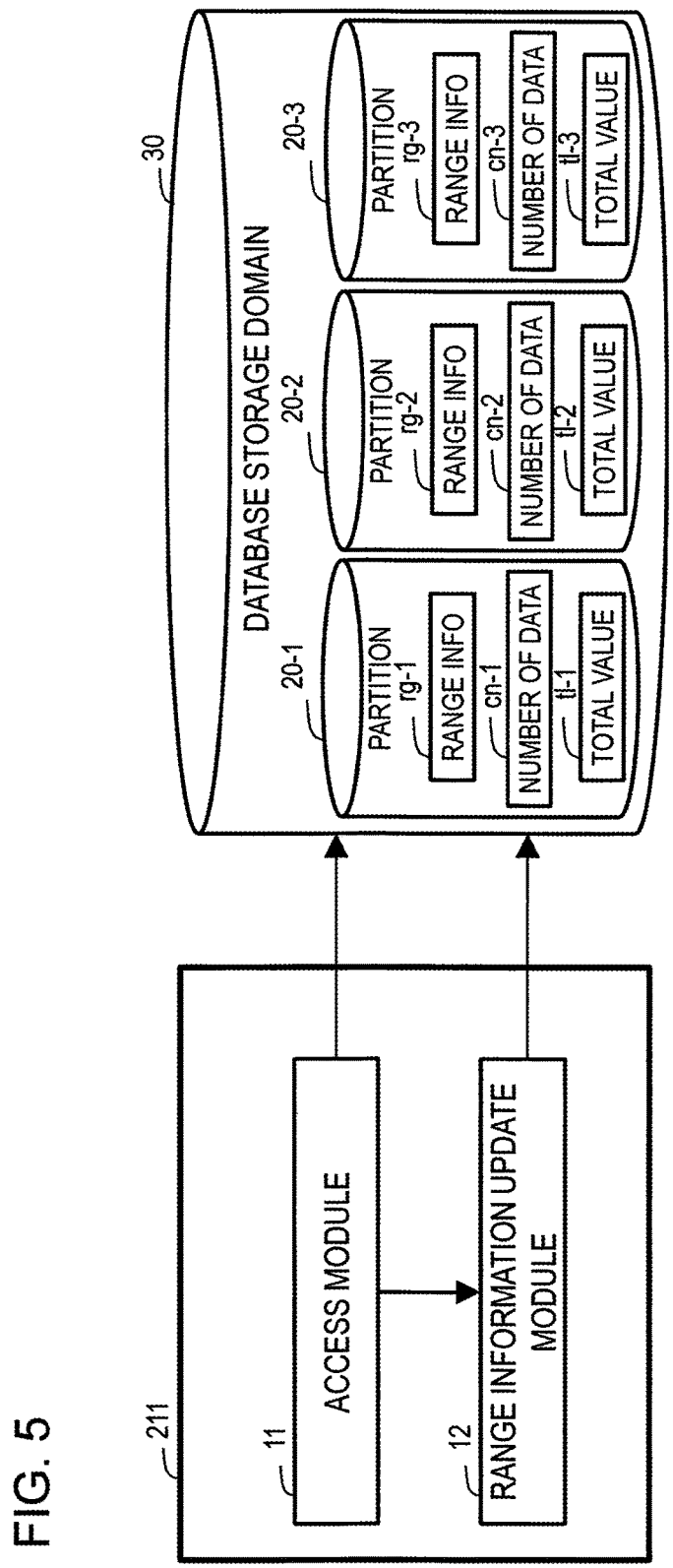
FIG. 5 is a diagram of constitution of the software block in the access program 211 of the information processing device 100 depicted by FIG. 4.

FIG. 5 is a Diagram of Constitution of the Software Block in the Access Program 211 of the information processing device 100 depicted by FIG. 4. In FIG. 5, same element as represented by FIG. 4 is illustrated the same sign in FIG. 4. As illustrated in FIG. 5, the access program 211 has a access module 11 and a range information update module (database program) 12, for example.

The access module 11 carries out the access processing to the database 30, in response to the access demand from the application program 210 depicted by FIG. 4. The access module 11 carries out the processing of a new addition and update of the data to the database 30 and a search and the deletion of the data from the database 30. The access module 11 determines the partition 20-1~20-3 for the access with reference to the range information rg-1~rg-3 as explained by FIG. 1, FIGS. 2A-C, for example. In addition, the access module 11 calls the range information update module 12 depending on the access processing for the database 30.

The range information update module 12 updates the number of the data "cn" and the total value "tl" of the partition 20-1~20-3 for the access depending on the access processing. And the range information update module 12 carries out the update process of the range information rg-1~rg-3 of the partition 20-1~20-3 for the access based on the number of the data "cn" and the total value "tl" which are updated. For example, the range information update module 12, in response to the addition processing and update processing of data having the value which is not included in the range information rg, updates the range information rg so as to include the value concerned. In addition, the range information update module 12, in response to the deletion of data depending to deletion and update processing of the data, calculates a minimum or a maximum of the data in the partition 20 after the deletion and updates the range information rg depending on a comparison calculated minimum or maximum with the existing range information rg (before deletion).

Below, the processing content that the hardware constitution depicted by FIG. 4 execute will be explained using the software modules 11 and 12 depicted by FIG. 5, sequentially. At first, according to FIG. 6 and FIG. 7, the process, which calculates the minimum of the data in the partition 20 after the deletion and updates the range information rg according to the minimum which is calculated, will be explained. Then, according to FIG. 8, FIG. 9, the process, which calculates the maximum of the data in the partition 20 after the deletion and updates the range information rg according to the maximum which is calculated, will be explained.

[Calculation of the Minimum]

Figure 6:
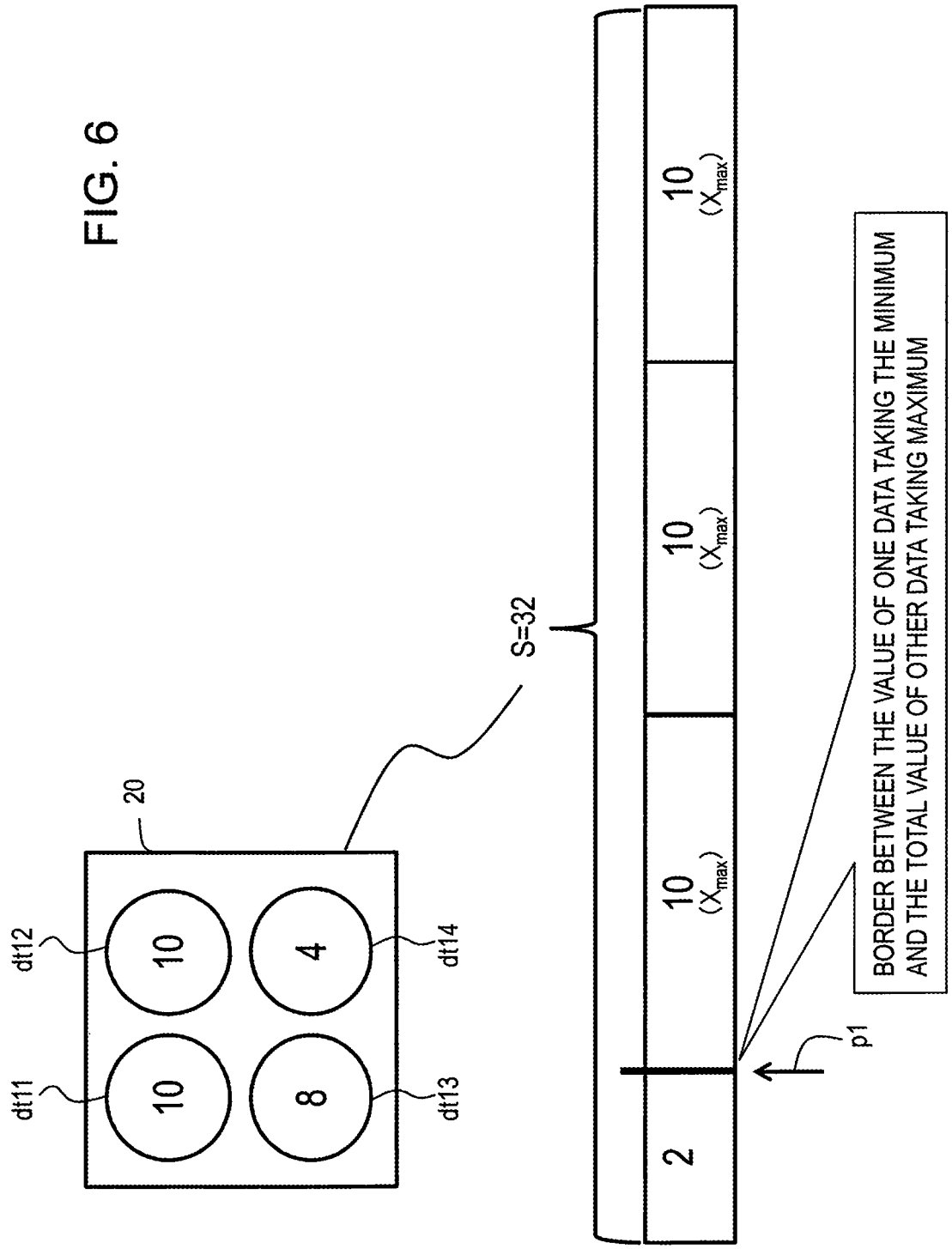
FIG. 6 is a diagram explaining the calculation processing that the range information update module 12 depicted by FIG. 5 carries out calculates the minimum of the appointed item in the partition 20 after deletion.

FIG. 6 is a diagram explaining the calculation processing that the range information update module 12 depicted by FIG. 5 carries out calculates the minimum of the appointed item in the partition 20 after deletion. FIG. 6 indicates the partition 20 after the deletion of data according to a deletion condition. The partition 20 after the deletion depicted by FIG. 6 has four data dt11~dt14. In addition, the real partition 20 has a large quantity of data, but the partition in FIG. 6 represents a simple example for explanation.

The range information update module 12 updates the number of the data "cn" and the total value "tl" of the appointed item of the partition 20 after deletion, in information after the deletion, in response to the deletion of data. And the range information update module 12 calculates the minimum "Tmin" based on the maximum "Xmax" of existing range information rg before the deletion and the number of the data "cn" and the total value "tl" of the partition 20 after the deletion. In other words, the range information update module 12 calculates the estimate "Tmin" of the minimum of the partition 20 after the deletion by calculation processing.

The range information update module 12 calculates the minimum "Tmin" according to expression 1 "Tmin=S−{Xmax*(N−1)}". The value "S" in the expression 1 indicates real total value "tl" of the appointed item of the partition 20 after the deletion. In addition, value "N" in the expression 1 indicates the number of the real data "cn" of the partition 20 after the deletion.

A sub-expression "Xmax*(N−1)" in the expression 1 indicates a total value of other data when the value of other data except one data among data in the partition 20 after the deletion is supposed to be the maximum "Xmax" in the range information rg concerned. Therefore, "S−{Xmax*(N−1)}", which is a difference between the total value of other data and the total value "S" (tl) of data of partition 20 after the deletion, indicates the value "Tmin" of one data in a case when other data indicate the maximum "Xmax". Because other data indicate the maximum, it may be said that the one data indicates the minimum.

Really, other data indicate the maximum "Xmax" or a smaller value than the maximum "Xmax". Accordingly, it may be said that the value "Tmin" of one data which is calculated is the lower limit value that the minimum of the partition 20 after the deletion can take. An arrow sign p1 depicted by FIG. 6 indicates the border between the value of one data taking the minimum and the total value of other data taking maximum "Xmax". In other words, the real value of one data is a value more than the value "Tmin" of which the arrow sign p1 indicates.

According to the data example of FIG. 6, the total value "S" (tl) of data dt11~dt14 in the partition 20 after the deletion is value "32" (=10+10+8+4). In addition, the number of data dt11~dt14 "N" (cn) in the partition 20 after the deletion is value "4". In addition, the maximum "Xmax" in the range information rg in the example of FIG. 6 is value "10". Therefore, according to expression 1, the lower limit value "Tmin" of the minimum of the partition 20 after the deletion is value "2" (=32−{10*3}).

In this way, it is possible that the range information update module 12 easily calculates a lower limit value of the minimum of partition 20 after the deletion based on a difference between a total value based on maximum "Xmax" of range information rg of other data and a total value "S" (tl) of the value of the partition 20 after the deletion. The range information update module 12 estimates the lower limit value "Tmin" of the minimum as the minimum of partition 20 after the deletion. And the range information update module 12 updates the minimum "Xmin" in the range information rg by the minimum "Tmin" which is calculated, when the minimum "Tmin", which is calculated, exceeds the minimum "Xmin" of existing range information rg (before deletion). More information about the update processing will be described later according to FIG. 7.

In addition, it is possible that the expression 1 is modified into expression 2 "Xa=Tmin+{Xmax*(N−1)−Σ$_{i(i \neq a)}$Xi}". The value "Xa" in the expression 2 is real minimum "min" of data in the partition 20 after the deletion (referring to FIG. 3). In addition, the value "Σ$_{i(i \neq a)}$Xi" in the expression 2 is a real total value of other data except one data having the minimum among the data in the partition 20 after the deletion. In addition, the value "Tmin" and the value "N" (cn) in the expression 2 are the same as the expression 1.

According to the expression 1 which is mentioned above, the value "Tmin" is the difference between the total value "S" (tl) and the value "Xmax*(N−1)". Accordingly, it is possible that the adding formulas of value "Tmin" and the value "Xmax*(N−1)" in the expression 2 is replaced by the value "S" (tl). Therefore, the sub-expression "Tmin+{Xmax*(N−1)−Σ$_{i(i \neq a)}$Xi}" in the expression 2 indicates the difference between the total value S (tl) and the total value of other data except one data having the minimum, that is, a real minimum "Xa" of data in the partition 20 after the deletion. Accordingly, it may be said that the expression 2 is the expression that the expression 1 is rearranged.

Based on the expression 2, it is possible to prove that the value "Tmin" is a lower limit value of real minimum "Xa (=min)". That is, the sub-expression "{Xmax*(N−1)−Σ$_{i(i \neq a)}$Xi}" in the expression 2 indicates a difference between the total value "Xmax*(N−1)" when other data temporarily take maximum "Xmax" in the range information rg and real total value "Σ$_{i(i \neq a)}$Xi" of other data. Because the value "Xmax" is the maximum, the total value "Xmax*(N−1)" is more than the value "Σ$_{i(i \neq a)}$Xi". Therefore, a result value of the sub-expression "{Xmax*(N−1)−Σ$_{i(i \neq a)}$Xi}" indicates a positive value. In other words, it is possible that the expression 2 is replaced by an expression "Xa=Tmin+{positive value}".

The expression "Xa=Tmin+{positive value}" indicates that real minimum "Xa" is the value which is added a positive value to the value "Tmin". That real minimum "Xa" is the value which is added a positive value to the value "Tmin" indicates that the value "Xa" is values more than the value "Tmin". In other words, the expression "Xa=Tmin+{positive value}" indicates that the value "Tmin" is a lower limit value of the real minimum "Xa (=min)".

In this way, based on the expression 2 which is rearranged the expression 1, it is possible to prove that the value "Tmin" is a lower limit value of the real minimum "Xa (=min)". Then, according to FIG. 7, the details of the update processing of the minimum "Xmin" in the range information rg will be explained based on the different data example.

[Update of the Minimum]

Figure 7:
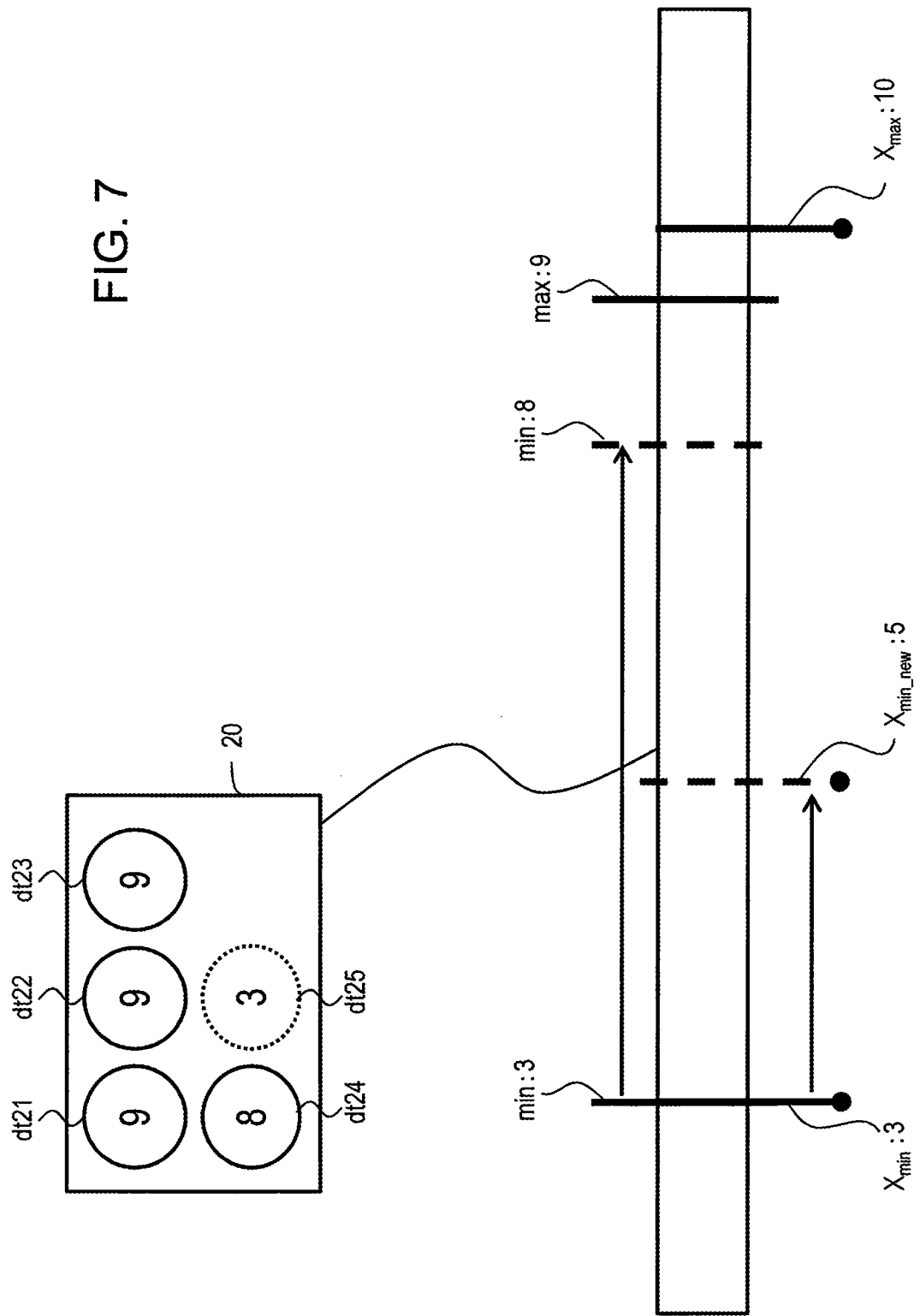
FIG. 7 is a diagram explaining the update processing of the minimum "Xmin" in the range information rg by the range information update module 12 which is depicted by FIG. 5.

FIG. 7 is a diagram explaining the update processing of the minimum "Xmin" in the range information rg by the range information update module 12 which is depicted by FIG. 5. FIG. 7 represents another example of data which is different from FIG. 6.

The partition 20 before the deletion depicted by FIG. 7 has five data dt21~dt25. In more detail, first . . . third data dt21~dt23 have value "9", and fourth data dt24 has value "8". In addition, the fifth data dt25 has value "3". In addition, in the example of FIG. 7, the range information rg of partition 20 before the deletion is value range "3 (Xmin)<=X<=10 (Xmax)". On the other hand, the real value range of the partition 20 before the deletion is value range "3 (min)<=X<=9 (max)". Therefore, in the example of FIG. 7, the maximum "10 (=Xmax)" in the range information rg does not match with the maximum "9 (max)" in the real value range.

In addition, even if the maximum "Xmax" in the range information rg does not match with the maximum "max" of the real value range, the minimum "Tmin" which is calculated cannot become a value bigger than the real minimum "min". In other words, the minimum "Tmin" which is calculated becomes the lower limit value of the real minimum "min".

As described above, according to the embodiment, the range information rg is a value range including a real value range. In other words, the maximum "Xmax" of range information rg is a value bigger than the real maximum "max". When the minimum "Tmin" is calculated based on the expression 1 depicted by FIG. 6, the minimum "Tmin" which is calculated is a value smaller than the real minimum "min", because the maximum "Xmax" in the range information rg is a value bigger than the real maximum "max". Therefore, the minimum "Tmin" which is calculated becomes the lower limit value of the real minimum "min".

FIG. 7 exemplifies a case to update the range information rg in response to deletion of the fifth data dt25 represented by a dotted line. Total value "S" (tl) of the appointed item of four data dt21~dt24 after the deletion is a value "35" (=9+9+9+8). In addition, the number of data dt21~dt24 "N" (cn) after the deletion is a value "4". In addition, the maximum "Xmax" in the range information rg is a value "10" as described above.

Therefore, the range information update module 12 calculates the minimum "Tmin=5 (=35−{10*3})" of partition 20 after the deletion based on the expression 1 described in FIG. 6. Then, the range information update module 12 determines whether or not update the range information rg according to the expression 3 "Xmin_new=max (Xmin, Tmin)". The expression 3 indicates an expression to update the range information rg, as new minimum "Xmin_new", in a bigger value among the minimum "Xmin" in the existing range information rg and the minimum "Tmin" which is calculated based on the expression 1. In other words, the range information update module 12 updates the minimum "Xmin" in the range information rg, when the minimum "Tmin" which is calculated according to the expression 3 is a value bigger than the minimum "Xmin" of existing range information rg.

As described in FIG. 6, the minimum "Tmin" which is calculated is a lower limit value of the minimum. When the minimum "Tmin" which is calculated is bigger than the minimum "Xmin" of existing range information rg, depending on the deletion of data, it indicates that a lower limit value of the minimum exceeded the minimum "Xmin" of existing range information rg. Accordingly, the range information update module 12 updates the minimum "Xmin" of range information rg, when the minimum "Tmin" which is calculated is bigger than the minimum "Xmin" of existing range information rg. Therefore, it is possible that range information update module 12 updates the minimum "Xmin" of range information rg after the update in a same value as the real minimum "min" or, approximate values smaller than the real minimum "min".

According to the example of FIG. 7, the minimum "Tmin=5" which is calculated is bigger than the minimum "Xmin: 3" in the existing range information rg. Therefore, the range information update module 12 updates the minimum "Xmin" in the range information rg, in value "5 (=Xmin_new)". According to the example of FIG. 7, the real minimum "min" of the partition 20 changes to value "8" from value "3" depending on deletion of the fifth data dt25. In contrast, it is possible that the range information update module 12 updates the minimum "Xmin" of range information rg in an approximate value "5" smaller than the real minimum "8" without scanning processing.

In this way, the range information update module 12 updates the range information rg when a lower limit value of the minimum after the deletion of data exceeds the minimum "Xmin" of range information rg. It is possible that the range information update module 12 updates the range information rg in the value range which includes a real value range and is not far apart from the real value range, by updating the minimum "Xmin" in the range information rg, in a lower limit value of the minimum which is calculated.

Accordingly, it is possible that the range information update module 12 updates the range information rg in the value range which includes the real value range and is not far apart from the real value range without scan processing. In other words, it is possible that the range information update module 12 updates the range information rg in the value range which avoids an omission of search and restrains outbreak of the useless search processing while holding down load when updating the range information rg. The range information update module 12 in this way makes efficiency of the search processing of the database 30 based on the range information rg feasible while holding down the load when updating the range information rg. In addition, it is possible to assign more resources of CPU 101 (referring to FIG. 4) to other processing which parallel operates with the database system 400, because the load when updating the range information rg is held down.

In addition, the real value range does not greatly change, even if deletion (update) did data having the value of the edge when the distribution of the value of data in the partition 20 does not have deviation. In other words, when deleting the data of partition 20 in which the distribution of the value of data does not have deviation, the range information rg does not greatly change even if the range information rg is updated by the scan processing. Therefore, the influence on the range information rg caused by not executing the scan processing is small, when deleting the data of partition 20 in which the distribution of the value of data does not have deviation.

On the other hand, deviation of the data may occur for the distribution of the value of data of partition 20, when the access to the database 30 continues. When the distribution of the value of data deviates to either directions and deletion (update) does the data having an edge value with a little distribution, the real value range may greatly change. Therefore, the range information update module 12 judges whether or not the range information rg greatly changed by comparing the minimum "Xmin" of range information rg with the minimum "Tmin" which is calculated, and updates the range information rg when judged that the range information rg greatly changed. In this way, it is possible that the range information update module 12 updates the range information rg in the value range which includes the real value range and is not far apart from the real value range when the real value range greatly changes.

In this way, the range information update module 12, depending on the deletion of data, does not update the range information rg when the range information rg does not greatly change, but updates the range information rg in the value range which is calculated according to simple calculation processing when the range information rg greatly changes. Therefore, the range information update module 12 updates the range information rg in the value range having predetermined precision without scanning the data.

According to the example of FIGS. 2A-C which is mentioned above, the range information update module 12 updates the range information rg-1 in the value range which includes the real value range "7<=X<=10" and matches with or is not far from the value range concerned, without scanning each data of partition 20-1.

In addition, the load by the scan processing increases with an increase of the number of the data of which the partition 20 has. Therefore, the processing of the range information update module 12 according to the embodiment is particularly effective when there is much number of the data of which the partition 20 has.

In addition, the update processing of the range information rg according to the embodiment is particularly effective when update processing and deletion processing occur continually. When the update processing and the deletion processing occur continually, the load largely rises, because the scan processing is occurred for each update of the range information rg. In this way, the influence occurs in the performance of other processing which operates with the database system 400 in parallel. In contrast, because the scan processing is not carried out at the time of update of range information rg, it is possible that the range information update module 12 according to the embodiment controls a rise of the load even if the update processing and the deletion processing occur continually.

[Calculation of the Maximum]

Figure 8:
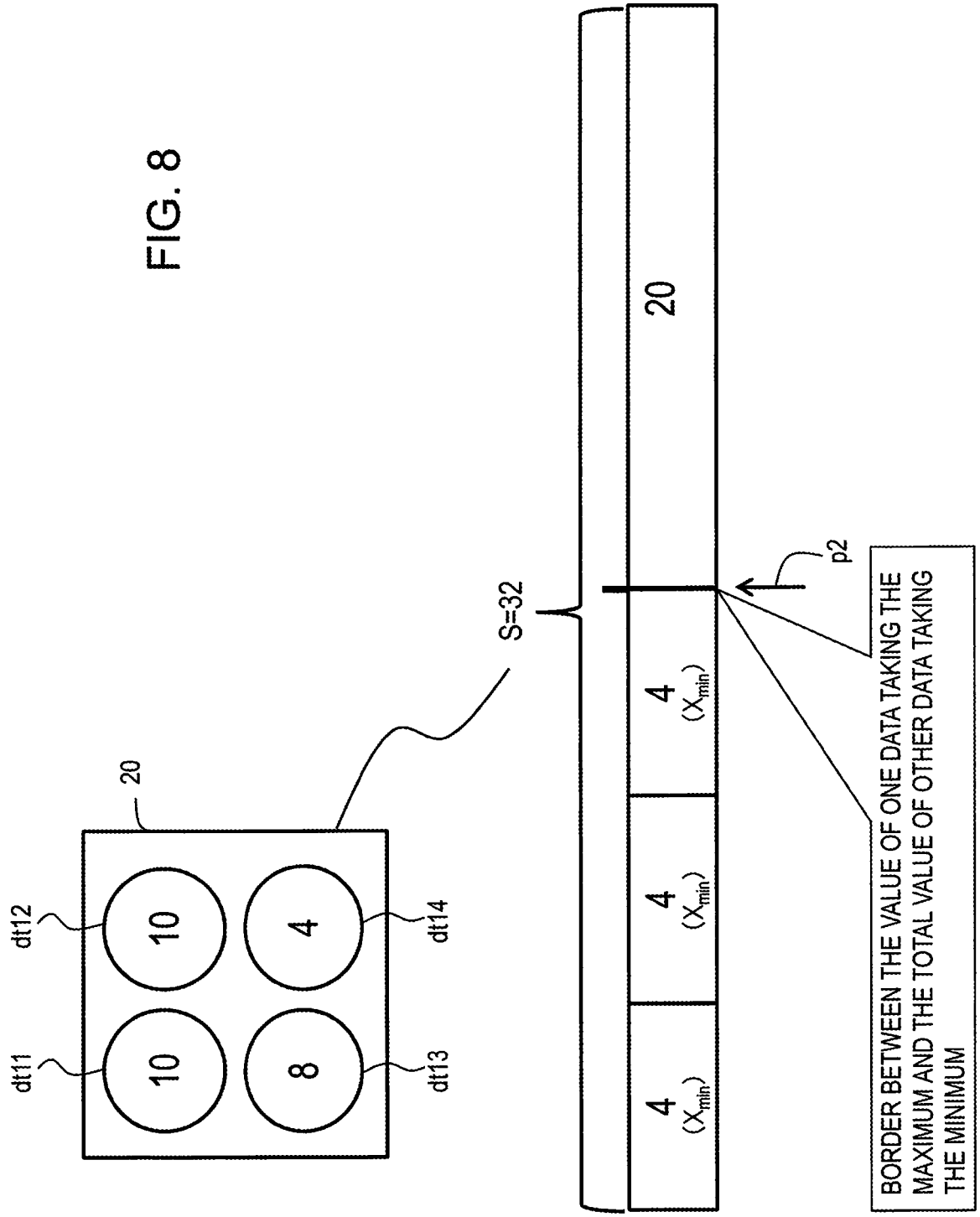
FIG. 8 is a diagram explaining the calculation processing of the maximum of the appointed item in the partition 20 after the deletion according to the range information update module 12 depicted in FIG. 5.

FIG. 8 is a diagram explaining the calculation processing of the maximum of the appointed item in the partition 20 after the deletion according to the range information update module 12 depicted in FIG. 5. In FIG. 8, four data dt11~dt14 in the partition 20 after the deletion are the same as an example of FIG. 6.

The range information update module 12 updates the number of the data "cn" and the total value "tl" of the appointed item in the partition 20 of which data is deleted, in information after the deletion, in response to the deletion of data. And the range information update module 12 calculates the maximum "Tmax" based on the minimum "Xmin" of existing range information rg and the number of the data "cn" and the total value "tl" in the partition 20 after the deletion. In other words, the range information update module 12 calculates the estimate "Tmax" of the maximum of the partition 20 after the deletion by calculation processing.

The range information update module 12 calculates the maximum "Tmax" according to an expression 4; "Tmax=S−{Xmin X (N−1)}". The value "S" (tl) and the value "N" (cn) in the expression 4 are similar to the expression 1 which is explained in FIG. 6.

A sub-expression "Xmin*(N−1)" in the expression 4 indicates a total number of other data when it is supposed that the value of other data except one data among the data in the partition 20 after the deletion concerned is the minimum "Xmin" in the range information rg. Therefore, a difference "S−{Xmin*(N−1)}" between the total value of other data concerned and the total value "S" (tl) of the data in the partition 20 after the deletion, indicates the value "Tmax" of one data when the other data take the minimum "Xmin". Because other data take the minimum, it may be said that one data is data taking the maximum.

Other data really take the minimum "Xmin" or a bigger value than the minimum "Xmin". Therefore, it may be said that the value "Tmax" of one data which is calculated is the upper limit value that the maximum of partition 20 after the deletion take. An arrow p2 depicted by FIG. 8 indicates the border between the value of one data taking the maximum and the total value of other data taking the minimum "Xmin". In other words, the real value of one data is value smaller than the value "Tmax" depicted by the arrow p2.

As explained by FIG. 6, in the partition 20 after the deletion, the total number "S" (tl) of the data dt11~dt14 is a value "32" (=10+10+8+4), and the value "N" (cn) indicating the number of the data is a value "4". In addition, in the example of FIG. 8, the minimum "Xmin" in the range information rg is a value "4". Therefore, according to the expression 4, upper limit value "Tmax" of the maximum in the partition 20 after the deletion is a value "20" (=32−{4*3}).

In this way, it is possible that the range information update module 12 easily calculates the upper limit value of the maximum in the partition 20 after the deletion based on the difference between a total value based on minimum "Xmin" of range information rg of other data and the total value "S" (tl) of the value in the partition 20 after the deletion. The range information update module 12 estimates the upper limit value "Tmax" of the maximum as the maximum of the partition 20 after the deletion. And the range information update module 12 updates the maximum "Xmax" in the range information rg, in the maximum "Tmax" which is calculated, when the maximum "Tmax" which is calculated is smaller than the maximum "Xmax" in existing range information rg.

Then, according to FIG. 9, the details of the update processing of the maximum "Xmax" in the range information rg will be explained.

[Update of the Maximum]

Figure 9:
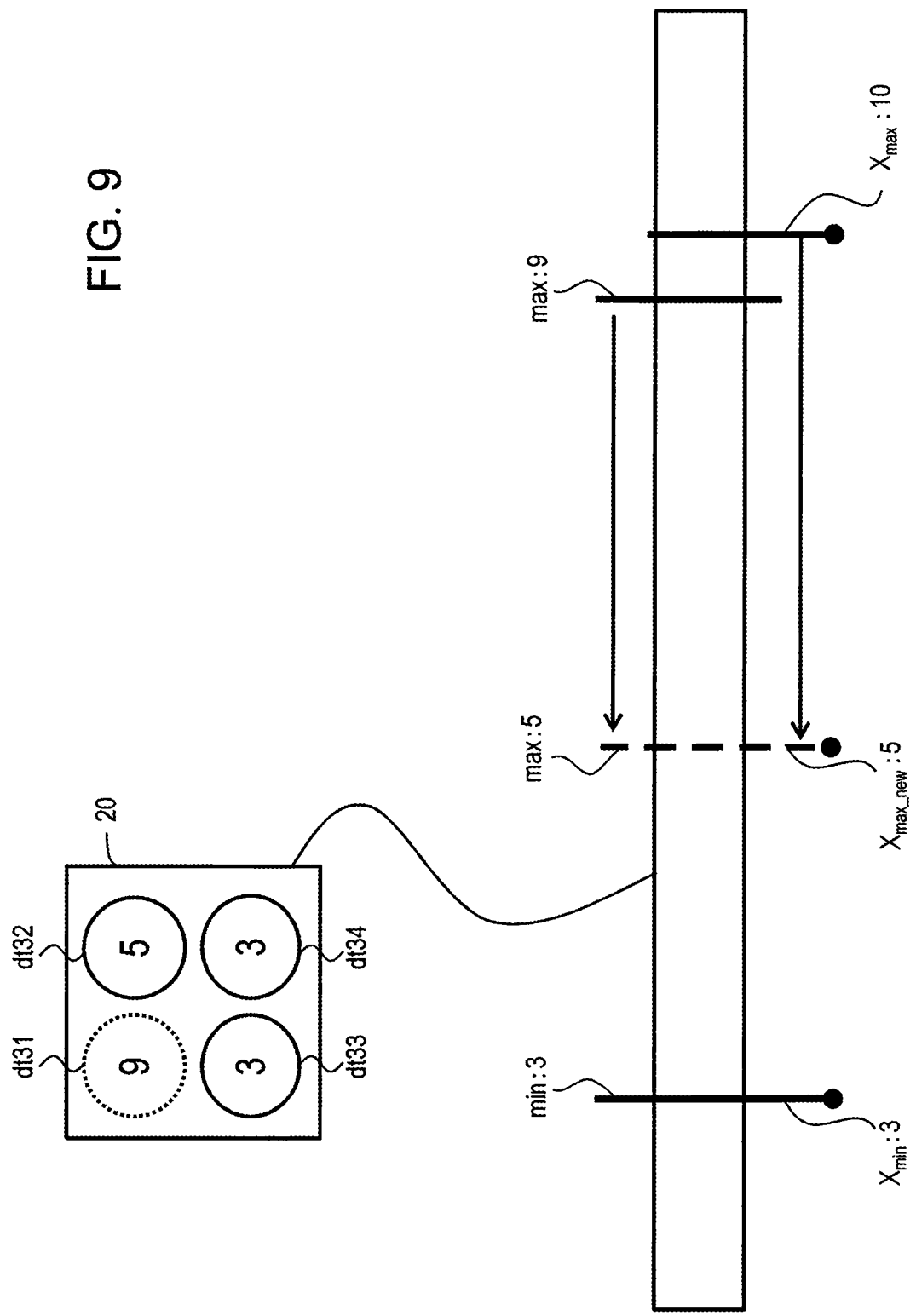
FIG. 9 is a diagram explaining update processing of the maximum "Xmax" in the range information rg by the range information update module 12 depicted in FIG. 5.

FIG. 9 is a diagram explaining update processing of the maximum "Xmax" in the range information rg by the range information update module 12 depicted in FIG. 5. FIG. 9 illustrates the example of data which is different from FIG. 8.

The partition 20 before the deletion depicted by FIG. 9 has four data dt31-dt34. A first data dt31 has a value "9", and a second data dt32 has a value "5". In addition, a third, and a fourth data dt33, dt34 have a value "3". In addition, in the example of FIG. 9, the range information rg of the partition 20 before the deletion is value range "3 (=Xmin)<=X<=10 (=Xmax)". On the other hand, the real value range of the partition 20 before the deletion is value range "3 (=min) <=X<=9 (=max)". As same as an example of FIG. 7, the maximum "10 (=Xmax)" in the range information rg does not match with the maximum "9 (=max)" in the real value range.

FIG. 9 exemplifies a case to update the range information rg in response to deletion of the first data dt31 illustrated by a dotted line. The total value "S" (tl) of the appointed item of three data dt32~dt34 after the deletion is value "11" (=5+3+3). In addition, number "N" (cn) of data dt32-dt34 of the partition 20 after the deletion is value "3". In addition, the minimum "Xmin" in the range information rg is value "3" as mentioned above.

Therefore, the range information update module 12 calculates the minimum of the partition 20 after the deletion "Tmax=5 (=11−{3*2})" based on the expression 4 depicted by FIG. 8. Then, the range information update module 12 judges whether or not updates the range information rg according to the expression 5: "Xmax_new=min (Xmax, Tmax)". The expression 5 represents an expression to update the range information rg, as new maximum "Xmax_new", in a smaller value among the maximum "Xmax" of existing range information rg and the maximum "Tmax" which is calculated based on the expression 4. In other words, the range information update module 12 updates the maximum "Xmax" in the range information rg according to the expression 5, when the maximum "Tmax" which is calculated is a value smaller than the maximum "Xmax" of existing range information rg.

The maximum "Tmax" which is calculated is an upper limit value of the maximum as illustrated by FIG. 8. When the maximum "Tmax" which is calculated is smaller than the maximum "Xmax" of existing range information rg, it indicates that an upper limit value of the maximum was smaller than the maximum "Xmax" of existing range information rg, depending on the deletion of data. Therefore, the range information update module 12 updates the maximum "Xmax" of range information rg, when the maximum "Tmax" which is calculated is smaller than the maximum "Xmax" of existing range information rg. In this way, it is possible that the range information update module 12 updates the maximum "Xmax" in the range information rg after the update, in a value as same as real maximum "max" or approximate value bigger than the maximum "max".

According to the example of FIG. 9, the maximum "Tmax:5" which is calculated is smaller than the maximum "Xmax:10" of existing range information rg. Therefore, the range information update module 12 updates the maximum "Xmax" in the range information rg, in the value "5 (=Xmax_new)". According to the example of FIG. 9, the real maximum "max" of the partition 20 changes to value "5" from value "9" depending on deletion of first data dt31. In contrast, it is possible that the range information update module 12 updates the maximum "Xmax" in the range information rg, in the value which is the same as the real maximum without scan processing.

In this way, the range information update module 12 updates the range information rg when an upper limit value of the maximum after the deletion of data is smaller than the maximum "Xmax" in the range information rg. It is possible that the range information update module 12 updates the range information rg in the value range which includes a real value range and is not far apart from the real value range, by updating the maximum "Xmax" in the range information rg, in an upper limit value of the maximum which is calculated.

Therefore, it is possible that the range information update module 12 updates the range information rg in the value range which includes a real value range and is not far apart from the real value range without scan processing. In other words, it is possible that the range information update module 12 updates the range information rg in the value range which avoids an omission of search and restrains outbreak of the useless search processing while holding down load when updating the range information rg. The effect in the update processing of the maximum "Xmax" in the range information rg illustrated by FIG. 8, FIG. 9 is similar to the effect of the update processing of the minimum "Xmin" in the range information rg which is explained in FIG. 6, FIG. 7.

In addition, FIG. 6~FIG. 9 exemplified the case that value "X" of the appointed item took value "3", . . . value "9". But it is easy to occur deviation in the distribution of the value of data of partition 20, when the value "X" takes the value of the bigger width. Therefore, it is easy to produce update of range information rg depicted by FIG. 6~FIG. 9 when value "X" takes the value of the bigger width according to the range information update module 12 in the embodiment.

In addition, value "X" of the appointed item exemplified a case to take numerical value in the embodiment. But the processing of the range information update module 12 according to the embodiment is effective for the case that the value "X" of the appointed item is a date and time.

In the case that the value "X" of the appointed item are a date and time, the range information update module 12 converts a date and time into numerical values and carries out update processing of the range information rg depicted by FIG. 6~FIG. 9. In this way, it is possible that the range information update module 12 updates the range information rg in the value range which includes a real value range and is not far apart from the real value range without scan processing when the value "X" of range information rg is a date and time.

Then, according to FIG. 10, a flow of the update processing of range information rg which is explained in FIG. 6~FIG. 9 will be described according to a flow chart.

[Flow of the Update Processing of Range Information]

Figure 10:
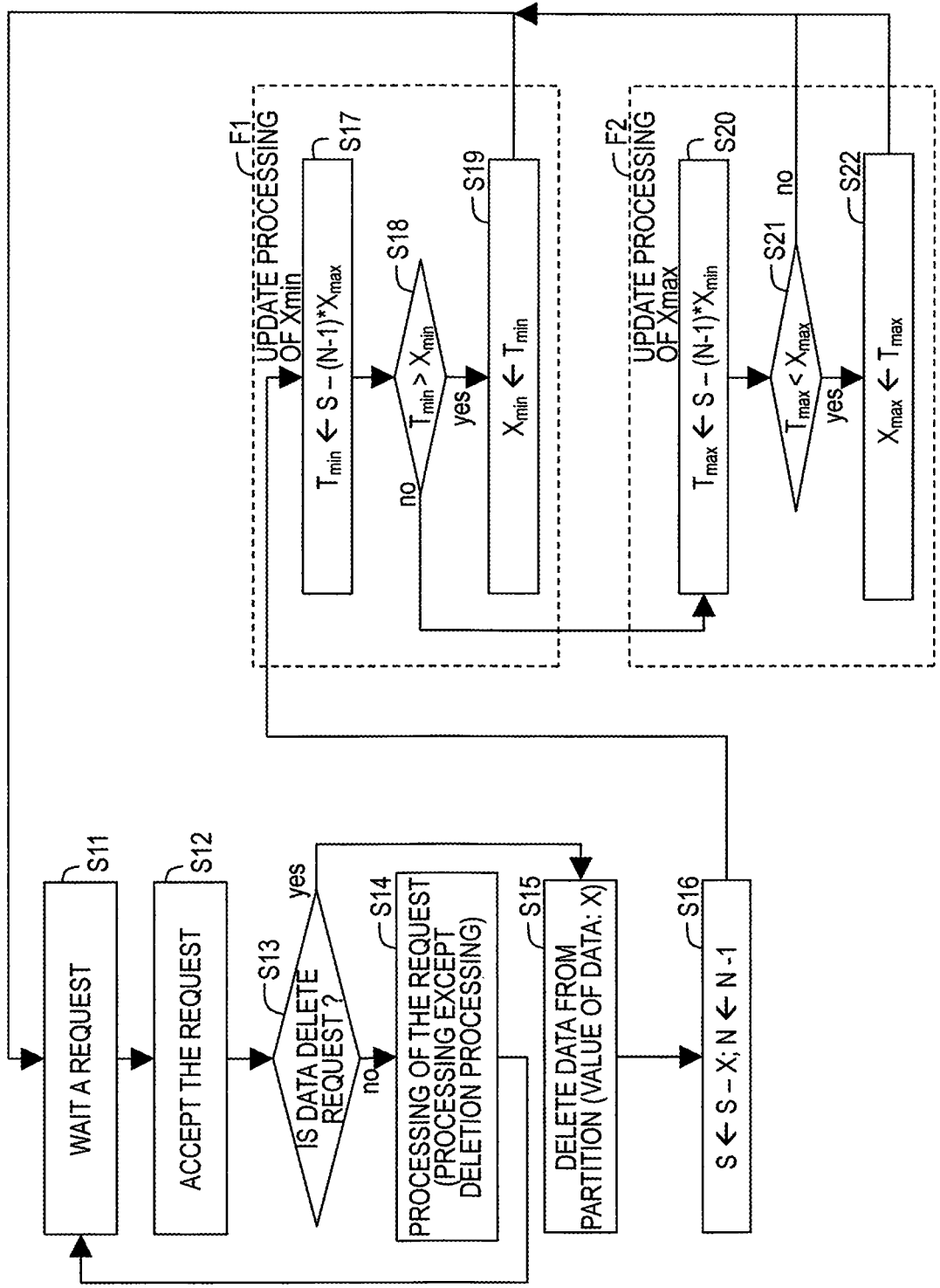
FIG. 10 is a diagram of flow chart explaining a flow of the update processing (FIG. 6-FIG. 9) of the range information rg by the access program 211 which is explained in FIG. 5.

FIG. 10 is a diagram of flow chart explaining a flow of the update processing (FIG. 6-FIG. 9) of the range information rg by the access program 211 which is explained in FIG. 5.

S11: The access module 11 of the access program 211 waits for an access request (demand) to the database 30 from the application program 210 depicted by FIG. 5. For example, the access request is requests such as a new addition, the update of data to the database 30 and a search, the deletion of data from the database 30.

S12: When the access module 11 accepts the request, the process moves to process S13.

S13: The access module 11 judges whether or not the request which is accepted is the deletion request of data.

S14: When the request which is accepted is a request except the deletion of data (no of S13), the access module 11 carries out processing depending to the request. In other words, the access module 11 performs a new addition and the update of data to the database 30, and the search processing of the data from the database 30.

That is, not illustrated in FIG. 10, the range information update module 12 updates the range information rg in response to a new addition request and the update request of data to the database 30 as needed. Especially, the range information update module 12 updates the range information rg when the value of the additional data with a new addition request and the update request is a value which is not included in the existing range information rg.

In addition, the update request of data includes the deletion of former data of data for the update. Therefore, the range information update module 12 carries out update processing of the range information rg represented by the processes S16-S22 for the deletion of the data with the update request of data. Especially, the range information update module 12 acquires value "X" of the appointed item of the deletion data with the update request of data, and moves to process S16.

For example, the range information update module 12 carries out update processing of the range information rg depending on the deletion data with the update request, after carrying out the update processing of range information rg depending on the additional data with the update request. However, the range information update module 12 may carry out the update process of the range information rg depending on the additional data after carrying out the update processing of the range information rg depending on the deletion data.

S15: On the other hand, when the request that is accepted is the deletion request of data (yes of S13), the access module 11 deletes the data from the partition 20 for the deletion which is judged based on the range information rg and calls the range information update module 12. The range information update module 12 acquires the value "X" of the appointed item of the data which is deleted.

S16: The range information update module 12 subtracts the value "X" from total value "S" (tl) of data in the partition 20 before the deletion and acquires the total value "S" (tl) of data in the partition 20 after the deletion. In addition, the range information update module 12 decrements number of the data "N" (cn) of partition 20 before the deletion and acquires number of the data "N" (cn) of partition 20 after the deletion.

S17: The range information update module 12 calculates the minimum "Tmin" of partition 20 after the deletion. The range information update module 12 calculates the minimum "Tmin" of partition 20 after the deletion according to the expression 1 depicted by FIG. 6 based on the total number "S" (tl) and number of the data "N" (cn) and the maximum "Xmax" in the range information rg which are acquired in the process S16.

S18: The range information update module 12 judges whether the minimum "Tmin" which is calculated in the process S17 is bigger than the minimum "Xmin" in the range information rg as explained by FIG. 7.

S19: When the minimum "Tmin" which is calculated is bigger than the minimum "Xmin" in the range information rg (yes of S18), it indicates that a lower limit value of the minimum of partition 20 after the deletion exceeds the minimum "Xmin" of existing range information rg depending on the deletion. Therefore, the range information update module 12 updates the minimum "Xmin" of range information rg, in the minimum "Tmin" which is calculated.

The range information update module 12 finishes the update processing of the range information rg after the process S19, and moves to the process S11. In other words, the range information update module 12 omits the update processing of the maximum "Xmax" in the range information rg (F2: S20-S22) when the minimum "Xmin" of range information rg is updated (S19).

S20: On the other hand, the range information update module 12 carries out update processing (F2) of the maximum "Xmax" in the range information rg when the minimum "Tmin" which is calculated is smaller than the minimum "Xmin" in the range information rg (no of S18). At first the range information update module 12 calculates the maximum "Tmax" of partition 20 after the deletion. The range information update module 12 calculates the maximum "Tmax" of partition 20 after the deletion according to the expression 4 depicted by FIG. 8 based on the total number "S" (tl) and number of the data "N" (cn) and the minimum "Xmin" in the range information rg which are acquired in process S16.

S21: The range information update module 12, as illustrated by FIG. 9, judges whether or not the maximum "Tmax" which is calculated in the process S20 is smaller than the maximum "Xmax" in the range information rg.

S22: When the maximum "Tmax" which is calculated is smaller than the maximum "Xmax" in the range information rg (yes of S21), it indicates that an upper limit value of the maximum of partition 20 after the deletion, depending on deletion, was smaller than the maximum "Xmax" of existing range information rg. Therefore, the range information update module 12 updates the maximum "Xmax" in the range information rg, in the maximum "Tmax" which is calculated. The range information update module 12 finishes the update processing of the range information rg after the process S22, and moves to the process S11.

In addition, when the maximum "Tmax" which is calculated is bigger than the maximum "Xmax" of range information rg (no of S21), the range information update module 12 moves to the process S11 without performing update (S22) of the maximum "Xmax" in the range information rg.

In addition, in the flow chart diagram of FIG. 10, the range information update module 12 performs the update processing (F2) of maximum "Xmax" of range information rg after update processing of range information rg (F1) of the minimum "Xmin". But the range information update module 12 may perform the update processing of range information rg (F1) of the minimum "Xmin" after the update processing (F2) of the maximum "Xmax" in the range information rg.

In addition, in the embodiment as mentioned above, it is easy to occur the update of range information rg when the distribution of the value of data deviates to either direction and the deletion (update) does data having the edge of value on a side that there is little distribution. Therefore, in the embodiment, it is hard to produce the other update when either update of minimum "Xmin" or maximum "Xmax" in the range information rg occurs depending on the deletion of data. Especially, in an example of FIG. 7, the update of maximum "Xmax" is hard to occur when the update of minimum "Xmin" in the range information rg occurs depending on the deletion of data dt25.

Therefore, as described in FIG. 10, when the range information update module 12 updates the minimum "Xmin" of range information rg (S19), the range information update module 12 omits (or skips) the update processing (F2) of the maximum "Xmax" in the range information rg. In other words, the range information update module 12 omits the calculation processing (S20) of the value "Tmax" and the judgment processing (S21) of the value "Tmax". In this way, it is possible that the range information update module 12 promotes efficiency of update processing of range information rg and reduces load more.

In addition, it is similar when carrying out the update processing of the minimum "Xmin" in the range information rg (F1) after carrying out the update processing (F2) of the maximum "Xmax" in the range information rg. When the maximum "Xmax" in the range information rg is updated, the range information update module 12 may omit the update processing of minimum "Xmin" in the range information rg (F1). As similar as, it is possible that the range information update module 12 promotes efficiency of update processing of range information rg and reduces load more.

Other Embodiment

In addition, in the flow chart of FIG. 10, the process is explained in a case when each of partitions 20 has the range information rg of single appointed item. But the partition 20 may have range information rg for each of a plurality of items as mentioned above in FIG. 4. When there is a plurality of range information rg, the range information update module 12 updates a plurality of range information rg by repeating the processes S16~S22 of FIG. 10 for each of the range information rg in response to the deletion of data.

In addition, in the flow chart of FIG. 10, the update processing of range information rg when deleting single data is explained. But the range information update module 12 may carry out the update processing of the range information rg depicted by FIG. 10 in response to the deletion of a plurality of data once.

When updating the range information rg in response to the deletion of the plurality of data, the range information update module 12 subtracts the value "X" for the plurality of data from the total value "S" (tl) in the process S16 and acquires the total value "S" (tl) of data of partition 20 after the deletion. In addition, the range information update module 12 decrements value "N" (cn) for the plurality of data in the process S16. The following process of process S16 is similar to FIG. 10.

Accordingly, because the processing of the process S16~S22 do not occur for every deletion of each data, it is possible that the calculation processing decreases and the load of the update processing of range information rg reduces more. When the deletion processing and update processing of data occur continually, this is particularly effective.

In addition, the range information update module 12 according to the embodiment updates the range information rg when the real value range greatly changes depending on the deletion of data. Therefore, the range information update module 12 may update the range information rg according to scan processing in a response to the update of the range information rg.

In this way, it is possible that the range information update module 12 updates the range information rg according to the scan processing when a real value range greatly changes, while omitting the scan processing when the real value range does not greatly change and controlling the load. Thereby, it is possible to improve precision of range information rg while controlling the load.

In addition, in the present embodiment, it is explained that the update processing of the range information rg of each partition 20 when the database 30 is divided into a plurality of partitions 20. But the process of the range information update module 12 according to the present embodiment is effective for the update processing of the range information rg in the database 30 which is not divided into a plurality of partitions 20. Even if the database 30 is not divided into a plurality of partitions 20, it is possible that the access module 11 filters the search processing of the database 30 itself based on the range information rg.

About the range information rg in the database 30 which is not divided, the range information update module 12 updates the range information rg according to a flow chart diagram of FIG. 10. In this way, it is possible that the range information update module 12 holds down load without scan processing when the range information rg is updated.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A database system comprising:
   a storage device which stores a database storing a plurality of data groups, range information including a minimum and a maximum of an appointed item in data in each of the plurality of data groups, a total value of the appointed item of the each of the plurality of data groups and a number of the data in the each of the plurality of data groups; and
   an information processing device comprising a processor configured to, in response to deletion of a first data in a first data group, update the total value of the appointed item and the number of the data of the first data group,
      calculate a first minimum value obtained from the updated total value subtracted by a product resulting from multiplying the updated number of the data minus 1 and the maximum value of the first data group,
      calculate a first maximum value obtained from the updated total value subtracted by a product resulting from multiplying the updated number of the data minus 1 and the minimum value of the first data group,
      judge at least one of whether the first minimum value which is calculated exceeds the minimum in the range information of the first data group and whether the first maximum value which is calculated is less than the maximum in the range information of the first data group, and
      update the range information of the first data group depending on the judgment.

2. The database system according to claim 1, wherein the processor is configured to update the minimum in the range information of the first data group in the first minimum value which is calculated when the first minimum value which is calculated exceeds the minimum in the range information of the first data group.

3. The database system according to claim 1, wherein the processor is configured to update the maximum in the range information of the first data group in the first maximum value which is calculated when the first maximum value which is calculated is less than the maximum in the range information of the first data group.

4. The database system according to claim 1, wherein the processor is configured to update the minimum in the range information in a value which is smaller than the minimum of the appointed item of the data group after the deletion or updates the maximum in the range information in a value which is bigger than the maximum of the appointed item of the data group after the deletion.

5. The database system according to claim 1, wherein the processor is configured to omit the calculation of the first maximum value of the data group after the deletion and the judgment when updating the minimum in the range information, or omit the calculation of the first minimum value of the data group after the deletion and the judgment when updating the maximum in the range information.

6. The database system according to claim 1, wherein the processor is configured to carry out the update, the calculation and the judgment in response to the deletion of the data of which the update processing and the deletion processing of the data in the data group include.

7. The database system according to claim 1, wherein the storage device is configured to store the plurality of data groups which are divided into a plurality of data of which the database has.

8. An information processing device comprising:
   a processor configured to access a database storing a plurality of data groups, range information including a minimum and a maximum of an appointed item in data in each of the plurality of data groups, a total value of the appointed item of the each of the plurality of data groups and a number of the data in the each of the plurality of data groups; and
   a storage unit in which the processor uses for carrying out processing,
   the processor, in response to deletion of a first data in a first data group:
      updates the total value of the appointed item and the number of the data of the first data group,
      calculates a first minimum value obtained from the updated total value subtracted by a product resulting from multiplying the updated number of the data minus 1 and the maximum value of the first data group,
      calculates a first maximum value obtained from the updated total value subtracted by a product resulting from multiplying the updated number of the data minus 1 and the minimum value of the first data group, judges at least one of whether the first minimum value which is calculated exceeds the minimum in the range information of the first data group and whether the first maximum value which is calculated is less than the maximum in the range information of the first data group, and updates the range information of the first data group depending on the judgment.

9. The information processing device according to claim 8, wherein the processor is configured to update the minimum in the range information of the first data group in the first minimum value which is calculated when the first minimum value which is calculated exceeds the minimum in the range information of the first data group.

10. The information processing device according to claim 8, wherein the processor is configured to and update the maximum in the range information of the first data group in the first maximum value which is calculated when the first maximum value which is calculated is less than the maximum in the range information of the first data group.

11. The information processing device according to claim 8, wherein the processor is configured to update the minimum in the range information in a value which is smaller than the minimum of the appointed item of the data group after the deletion or updates the maximum in the range information in a value which is bigger than the maximum of the appointed item of the data group after the deletion.

12. The information processing device according to claim 8, wherein the processor is configured to omit the calculation of the first maximum value of the data group after the deletion and the judgment when updating the minimum in the range information, or omit the calculation of the first minimum value of the data group after the deletion and the judgment when updating the maximum in the range information.

13. The information processing device according to claim 8, wherein the processor is configured to carry out the update, the calculation and the judgment in response to the deletion of the data of which the update processing and the deletion processing of the data in the data group include.

14. A non-transitory computer readable storage medium storing therein a program for causing a computer to execute a process, the process comprising:

updating, in response to deletion of a first data in a first data group among a plurality of data groups in a database, a total value of an appointed item of the data group and a number of data of the first data group, the database storing range information including a minimum and a maximum of the appointed item in data in each of the plurality of data groups, the total value of the appointed item and the number of the data in the each of the plurality of data groups;

calculating a first minimum value obtained from the updated total value subtracted by a product resulting from multiplying the updated number of the data minus 1 and the maximum value of the first data group;

calculating a first maximum value obtained from the updated total value subtracted by a product resulting from multiplying the updated number of the data minus 1 and the minimum value of the first data group;

judging at least one of whether the first minimum value which is calculated exceeds the minimum in the range information of the first data group and whether the first maximum value which is calculated is less than the maximum in the range information of the first data group; and updating the range information of the first data group depending on the judgment.

15. The storage medium according to claim 14, wherein the updating comprises updating the minimum in the range information of the first data group in the first minimum value which is calculated when the first minimum value which is calculated exceeds the minimum in the range information of the first data group.

16. The storage medium according to claim 14, the updating comprises updating the maximum in the range information of the first data group in the first maximum value which is calculated when the first maximum value which is calculated is less than the maximum in the range information of the first data group.

17. The storage medium according to claim 14, wherein the updating comprises updating the minimum in the range information in a value which is smaller than the minimum of the appointed item of the data group after the deletion or updating the maximum in the range information in a value which is bigger than the maximum of the appointed item of the data group after the deletion.

18. The storage medium according to claim 14, wherein the process further comprises:

omitting the calculation of the first maximum value of the data group after the deletion and the judgment when updating the minimum in the range information; and omitting the calculation of the first minimum value of the data group after the deletion and the judgment when updating the maximum in the range information.

19. The storage medium according to claim 14, wherein the updating of the total value and the number of the data comprises updating the total value and the number of the data, in response to the deletion of the data of which the update processing and the deletion processing of the data in the data group include.

20. The storage medium according to claim 14, wherein the updating of the total value and the number of the data comprises updating the total value and the number of the data in the database which stores the plurality of data groups which a plurality of data in the database are divided into, in response to the deletion of the data in the data group.

* * * * *